ELECTRICAL SWITCH WITH CAMMING BRIDGING CONTACT

Original Filed March 31, 1964 2 Sheets-Sheet 1

INVENTOR.
BENJAMIN H. MATTHEWS
BY
Meyer, Baldwin, Dean, & Egan
ATTORNEYS

ELECTRICAL SWITCH WITH CAMMING BRIDGING CONTACT

Original Filed March 31, 1964 2 Sheets-Sheet 2

INVENTOR.
BENJAMIN H MATTHEWS
BY
Meyer, Baldwin, Doran & Egan
ATTORNEYS

United States Patent Office

Re. 26,267
Reissued Sept. 26, 1967

26,267
ELECTRICAL SWITCH WITH CAMMING BRIDGING CONTACT

Benjamin H. Matthews, Peninsula, Ohio, assignor to Lucerne Products, Inc., Northfield, Ohio, a corporation of Ohio Original No. 3,222,488, dated Dec. 7, 1965, Ser. No. 356,277, Mar. 31, 1964. Application for reissue Feb. 28, 1966, Ser. No. 534,282
5 Claims. (Cl. 200—166)

Matter enclosed in heavy brackets [ ] appears in the original patent but forms no part of this reissue specification; matter printed in italics indicates the additions made by reissue.

This invention relates to improvements in an electric switch, and particularly in that kind of switch wherein a bridging contact is slidable with respect to spaced stationary contacts between a non-bridging position and a bridging portion.

One of the objects of the present invention is to improve a slidable bridging contact as mentioned above by providing means for lifting the leading end of the bridging contact until it is at least in partial registry with one of the stationary contacts and thereafter to permit it to drop into engagement with the approached stationary contact.

Other objects and advantages of this invention will be apparent from the accompanying drawings and description and the essential features thereof will be set forth in the appended claims.

In the drawings:

FIGS. 6 and 7 are views similar to FIG. 5 but showing different positions of the bridging contact; while

In that type of electric switch wherein a bridging contact slides along an insulator base relative to spaced stationary contacts having contact-making faces parallel to and either at or slightly above the surface of the insulator base, a problem arises when the bridging contact wipes electrically insulating material from the base onto one or more of the stationary contacts which ultimately interferes with electrical conductivity between engaging contacts. It is an object of the present invention to avoid this trouble by providing a simple means for lifting the leading end of the bridging contact as it approaches the to-be-contacted stationary contact, and thereafter permitting the leading end of the bridging contact to drop into engagement with the approached stationary contact, thus avoiding the wiping of any insulating material from the insulated base onto the stationary contact.

Figure 1:
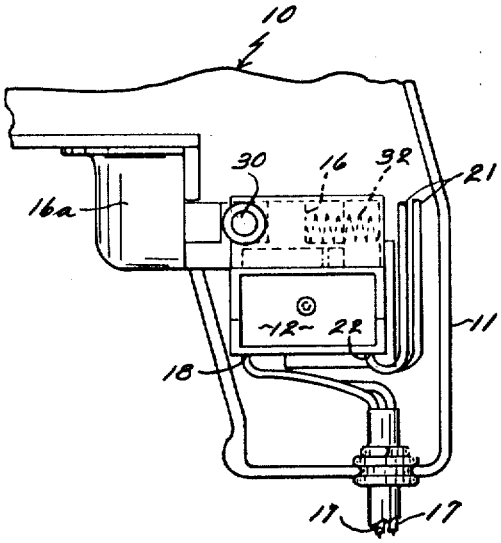
FIG. 1 is a side elevation of this invention positioned for use in a hollow handle of a portable tool or the like, the handle itself being shown in section.
Figure 2:
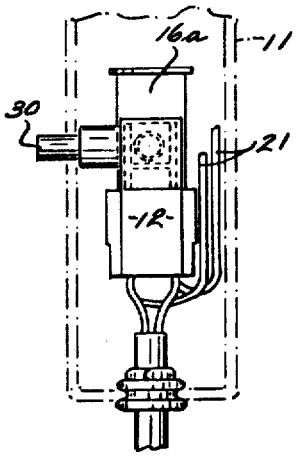
FIG. 2 is an end elevation of the same taken from the right-hand side of FIG. 1 and with the enclosed handle casing shown in dot-dash lines.
Figure 3:
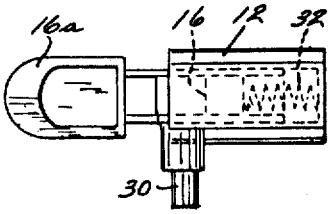
FIG. 3 is a top plan view of the device shown in FIGS. 1 and 2.
Figure 4:
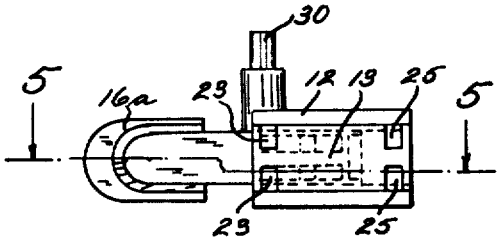
FIG. 4 is a bottom plan view of the same device.

Referring to FIG. 1, an electrically energized tool (not shown) is mounted on a housing 10 which in the case of a portable tool may be provided with a hollow pistol grip 11 which is used herein to illustrate one use of the present invention.

Figure 6:
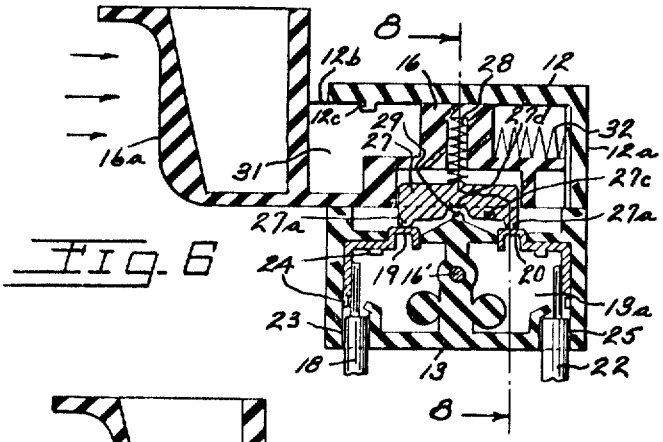
Figure 8:
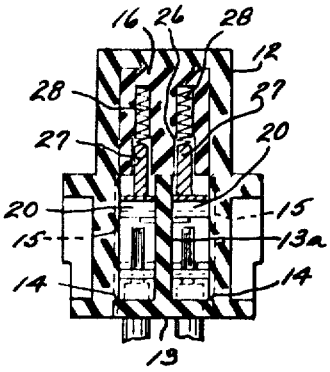
FIG. 8 is a sectional view taken along the line 8—8 of FIG. 6.

A switch casing 12 as best seen in FIGS. 1, 6 and 8, is mechanically secured in the handle 11 by any suitable means. This casing is generally U-shape as viewed in FIG. 8, entirely open at the left-hand end as viewed in FIG. 6, and open at the right-hand end at the lower half or that portion which is below an end wall 12a on the upper half of the casing. A stationary contact holder 13 is entered upwardly in the open lower end of the U-shape casing 12 as best seen in FIG. 8 and is properly positioned by horizontal shoulders 14 on the casing 12 and by vertical shoulders 15 also on the casing. The contact holder is held in proper assembled position in the casing 12 by a rivet 16' (FIG. 7) which passes through both of these members. A switch actuator 16 is slidable along the upper surfaces of the contact holder 13 in and out of an open end 12b at the upper left-hand portion of casing 12 as seen in FIG. 6. This actuator is provided with a unitary trigger portion 16a for actuation by the hand of the operator gripping the pistol grip 11. It should be understood that the parts 12, 13 and 16 are made of any suitable molded electrically insulating material.

This invention will be described in an embodiment of a switch which makes and breaks the contacts in both sides of an energizing electrical source, although those skilled in this art will understand that one side only of the line might incorporate the switch while the other line was unbroken. In FIG. 1, electrical conductors 17 are connected to a source of energy not shown and pass into the pistol grip 11 to be connected at 18 with one of two spaced stationary contacts such as the member 19 shown in FIG. 6 which is one of the pair including 19 and 20. Lines 21 are for the energization of the electrical equipment connected at 10 and have their ends at 22 connected to a contact such as 20 shown in FIG. 6. Since the switch actuating mechanism on both sides of the lines are identical, one only will be described.

Referring to FIG. 8, the stationary contact member 13 has a central vertical partition 13a which effectively separates the two switch contact mechanisms from each other. Referring to FIG. 6, the conductors 17 enter through a suitable opening 23 in the base of the member 13 and are tack welded or otherwise suitably electrically connected respectively with the stationary contacts 19. Each of the contacts 19 and 20 is of electrically conductive material which is slid into the open side of the member 13 before it is inserted in the casing 12. Each stationary contact member is held in the proper position by slight shoulders 24, 24 molded rigid with the member 13 and after the stationary contacts are slid in position and the parts are assembled as shown in FIG. 8 then the contacts 19 and 20 are held from sidewise movement between the wall 13a of the member 13 and the parallel side walls the casing 12 as shown in FIG. 8.

In a similar manner the conductor 22 enters through a suitable opening 25 in the base of member 13 and has its conductive member tack welded or otherwise suitably secured to the fixed contact 20.

Referring to FIGS. 6 and 8, the actuator 16 has two parallel elongated slots 26 which are just long enough to receive a bridging contact 27 in each slot capable of very little movement endwise of the slot but capable of movement vertically as viewed in FIGS. 6 and 8. A compression spring 28 urges each bridging contact toward the coacting stationary contacts. It will be noted that each bridging contact has projecting contact-making ends 27a having approximately the same spacing as that between the stationary contacts 19 and 20. Each bridging contact has a centrally located recess 27b for a purpose presently to be described. Preferably also, but not necessarily, portions of each bridging contact are cut away as shown at 27c between each projection 27a and the recess 27b.

In the member 13, an interrupted horizontal wall is formed integrally with the partition **13*a* and the end walls 13c. The partition wall 13b is interrupted to receive the contacts 19 and 20. Midway of this wall is an upwardly extending projection 29 which coacts with the bottom edge of the associated bridging contact 27** in a manner about to be described.

Forming no part of the present invention, and well known in the art, is spring pressed plunger 30 adapted, when pushed inwardly to place a pin in the notch 31 in the actuator 16 when it is desired to hold the actuator in switch closing position. The actuator is first moved to the position of FIG. 6, then the plunger 30 is pressed inwardly and the trigger member 16a is released whereupon the spring 32 which normally urges the actuator to switch-open position presses the actuator 16 against the spring pressed plunger and holds it in its depressed position. The next pressure upon the trigger member 16a releases the spring pressed plunger 30 so that it jumps outwardly and releases the switch.

The operation of this improved switch should now be readily understood. With the parts in the position of FIG. 5, the spring 32 maintains the actuator 16 and the bridging contact 27 in switch-open position with the projecting ends 27a of the bridging contact respectively on the same side of their coacting stationary contacts 19 and 20 but out of engagement therewith. Squeezing of the trigger member 16a then causes the actuator 16 to move toward the right from the position of FIG. 5 to that of FIG. 7, during which time the projection 29 has ridden along the bottom edge 27c of the bridging contact causing the leading end seen at the right in FIG. 7 to be lifted to an elevation higher than the fixed or stationary contact 20. When at least a portion of the leading end 27a is in registry over the stationary contact 20, the movement of the actuator 16 toward the right from the position of FIG. 7 to that of FIG. 6 permits the projection 29 to enter into the recess 27b, whereupon the leading end 27a of the bridging contact drops upon the coacting stationary contact 20, there being clearance in the recess 27b to permit this motion urged by the spring 28. Thus, the leading end 27a of the bridging contact is brought into engagement with the stationary contact 20 without rubbing any of the insulating material from the wall 13b over onto the engaged contact.

Figure 5:
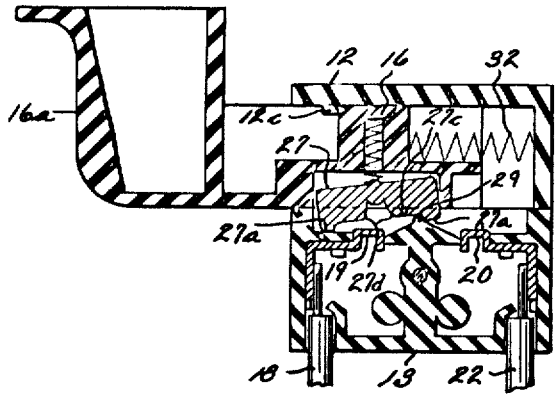
FIG. 5 is a sectional view, enlarged, taken along the line 5—5 of FIG. 4.
Figure 7:
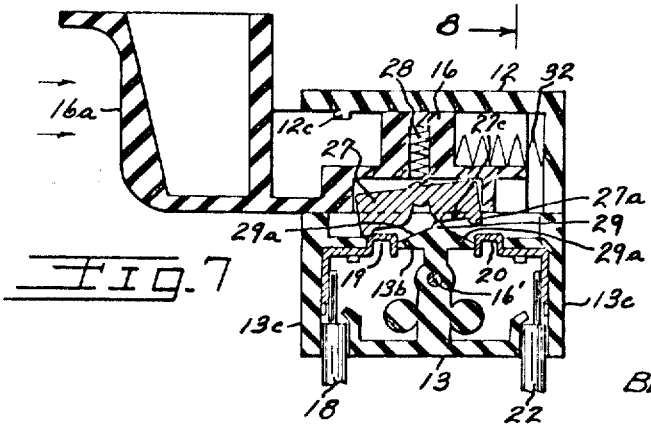

The parts are so constructed that the trailing end of the bridging contact engages its associated stationary contact before the leading end drops onto its coacting stationary contact. Therefore, arcing occurs at the leading contact only which gets hot while the trailing contact remains cool. The projection 29 holds the leading end 27a of the bridging contact at all times out of engagement with the base 13b, as seen in FIGS. 5 and 7. During the opening of the circuit, the contacts at the right in FIG. 6 break before the contacts at the left disengage.

The projection 29 and the shape of recess 27b are designed to reduce contact "bounce." The portions 29a are inclined upwardly and toward each other at a gentle angle of about 15° to 20° to the horizontal. Each portion 29a starts near a stationary contact 20 and ends at the central projection 29 which is arcuate and about 1/32 to 3/64 inch in lateral extent in the direction of bridging contact movement. The corners of recess 27b are rounded as shown at 27d.

A button 12c, integral wtih casing 12, prevents movement of member 16 too far to the left in FIG. 5, under the urging of spring 32.

When moving from the position of FIG. 7 to the position of FIG. 6, the leading end 27a of the bridging contact slides toward the right after it engages its associated bridging contact. This gives a wiping action at that time which keeps those two coacting contacts clean. Otherwise the arcing between those two contacts would deposit metallic oxides and the like.

What is claimed is:

1. In an electric switch, in combination, an insulator base, at least a pair of spaced stationary contacts mounted on said base with their contact-making faces coplanar, an electrically conductive bridging contact having opposite contacting ends spaced at approximately the same spacing as said stationary contacts, there being a recess in said bridging contact between said ends extending away from said flat surface, means supporting said bridging contact for linear sliding movement in line with said stationary contacts between a non-bridging position, where said ends lie respectively on the same side of associated stationary contacts and out of engagement therewith, and a bridging position where said ends engage said stationary contacts respectively, a projection on said base between said stationary contacts in engagement with said bridging contact as the leading contacting end thereof approaches the to-be-contacted stationary contact, said projection *pivoting* [camming] said bridging contact *about the trailing contact end thereof* to lift said leading contacting end during said movement to a level above the contact-making face of the to-be-contacted stationary contact, said recess being formed on said bridging contact as to register with said projection only after said leading contacting end registers with at least a portion of said approached stationary contact, said recess being of a depth to then permit said leading contacting end of said bridging contact to *be swung toward and to* engage said approached stationary contact, and means biasing said bridging contact toward said stationary contacts.

2. An electric switch as defined in claim 1 wherein the trailing contacting end of said bridging contact engages its associated stationary contact before said recess registers with said projection, whereby arcing takes place only between the leading contacting end of said bridging contact and its associated stationary contact.

3. An electric switch as defined in claim 2, there being a cut-away flat face between said recess and said leading contacting end of said bridging contact, said leading contacting end projecting toward said base beyond said flat face, and said projection being in engagement with said flat face between said non-bridging and bridging positions and holding said leading contacting end at all times out of contact with said base.

4. An electric switch as defined in claim 1, wherein said means supporting said bridging contact permits sliding movement of said bridging contact after said leading contacting end engages the associated contact, whereby to cause a wiping action between said contacting end and said stationary contact.

*5. In an electric switch, in combination, an insulator base defining a flat surface, at least a pair of spaced stationary contacts mounted on said base with their contact-making faces substantially coplanar, an electrically conductive bridging contact having opposite contacting ends spaced to bridge the distance between said stationary contacts, one of said ends being defined as the leading contacting end of said bridging contact and the remaining end the trailing contacting end, there being wall means defining a recess in said bridging contact between said contacting ends extending away from said flat surface, means supporting said bridging contact for linear sliding movement along said base in line with said stationary contacts between a nonbridging position, where the leading contacting end is out of engagement with one of said stationary contacts, and a bridging position where said contacting ends engage said stationary contacts, a projection supported on said base between the stationary contacts and extending above the contact-making faces of said stationary contacts and in engagement with said bridging contact, as the leading contacting end thereof approaches the to-be-contacted stationary contact, said projection pivoting said bridging contact about said trailing contacting end to raise said leading contacting end above said one of said stationary contacts as said bridging contact is moved to its nonbridging position, said recess being formed on said bridging contact as to register with said projection as said bridging contact is moved to its bridging position and the leading contacting end drops*

*onto at least a portion of the contact-making face of said one stationary contact, the trailing contacting end of said bridging contact engaging with the other of said stationary contacts prior to said leading contacting end engaging said to-be-contacted stationary contact as said bridging contact is moved toward its bridging position, and means biasing said bridging contact toward said stationary contacts.*

References Cited

The following references, cited by the Examiner, are of record in the patented file of this patent or the original patent.

UNITED STATES PATENTS

| | | | |
|---|---|---|---|
| 1,806,777 | 5/1931 | Wiley. | |
| 2,566,720 | 9/1951 | Dissinger | 200—76 |

FOREIGN PATENTS

| | | |
|---|---|---|
| 1,224,568 | 2/1960 | France. |

ROBERT S. MACON, *Primary Examiner.*

ROBERT K. SCHAEFER, D. SMITH, Jr., *Assistant Examiners.*